United States Patent
Godunov et al.

(10) Patent No.: US 9,154,519 B1
(45) Date of Patent: Oct. 6, 2015

(54) SYSTEM AND METHOD FOR ANTIVIRUS CHECKING OF OBJECTS FROM A PLURALITY OF VIRTUAL MACHINES

(71) Applicant: Kaspersky Lab ZAO, Moscow (RU)

(72) Inventors: Ilya B. Godunov, Moscow (RU); Pavel N. Yarykin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/667,964

(22) Filed: Mar. 25, 2015

(30) Foreign Application Priority Data

Feb. 20, 2015 (RU) .................... 2015105813

(51) Int. Cl.
*G06F 12/14* (2006.01)
*H04L 29/06* (2006.01)
*G06F 9/455* (2006.01)

(52) U.S. Cl.
CPC .......... *H04L 63/145* (2013.01); *G06F 9/45558* (2013.01); *G06F 2009/45587* (2013.01)

(58) Field of Classification Search
CPC .......... G06F 2009/45587; G06F 21/56; G06F 21/53; G06F 21/566; G06F 21/554; G06F 21/12; G06F 21/564; G06F 12/145; G06F 11/0712; H04L 63/20; H04L 63/145; H04L 63/0263; H04L 63/1416; H04L 63/10; H04L 63/0227; H04L 63/1441; H04L 63/1408; H04L 2463/144
USPC ................... 726/24, 22, 23; 711/147
See application file for complete search history.

(56) References Cited

U.S. PATENT DOCUMENTS

| | | | |
|---|---|---|---|
| 8,307,443 B2 | 11/2012 | Wang et al. | |
| 8,793,787 B2 | 7/2014 | Ismael et al. | |
| 8,806,625 B1 * | 8/2014 | Berger | 726/22 |
| 2007/0234337 A1 | 10/2007 | Suzuki et al. | |
| 2010/0306849 A1 * | 12/2010 | Zheng et al. | 726/24 |

OTHER PUBLICATIONS

Derek Uluski: "Real time anti-virus for a virtualized environment", Electrical and Computer Engineering Master'S Theses IRIS Northeastern University, No. Paper 21, Jan. 1, 2008, pp. 1-97, XP007918017, Retrieved from the Internet: URL:http://hdl.handle.net/2047/d1001715x.

* cited by examiner

*Primary Examiner* — Brian Shaw
(74) *Attorney, Agent, or Firm* — Arent Fox LLP; Michael Fainberg

(57) ABSTRACT

Disclosed are system and method for malware detection on virtual machines. An example method comprises: forming, on a virtual machine, a queue of identifiers of objects for malware analysis; determining a method for selecting objects in the queue for malware analysis; selecting one or more objects from the queue for malware analysis; providing identifiers of the selected objects to a security virtual machine for malware analysis; checking, by the security virtual machine, whether each of the selected objects has been previously provided for malware analysis by another virtual machine; when a selected object has not been previously provided by another virtual machine, performing, by the security virtual machine, a malware analysis of the selected object; and providing, to the virtual machine, a malware analysis result for the selected object.

17 Claims, 4 Drawing Sheets

SYSTEM AND METHOD FOR ANTIVIRUS CHECKING OF OBJECTS FROM A PLURALITY OF VIRTUAL MACHINES

CROSS-REFERENCE TO RELATED APPLICATIONS

This application claims benefit of priority under 35 U.S.C. 119(a)-(d) to a Russian Application No. 2015105813 filed on Feb. 20, 2015, which is incorporated by reference herein.

FIELD OF TECHNOLOGY

The present disclosure relates generally to the field of computer security, and more specifically to malware detection in a virtual computing environment.

BACKGROUND

Virtual machines are an indispensable part of modern computer technologies. On a single physical machine, also known as the "host machine", a large number of virtual machines can function at the same time, thus forming a virtual computing environment. Thus, for example, in order to form a corporate virtual environment, one deploys a group of virtual machines, often making use of standard models (pattern) of virtual machines. Accordingly, the virtual machines deployed from the same standard model will contain a large number of identical files.

A virtual machine, like any physical computer system, is also vulnerable to malicious software. Consequently, there is a need for antivirus checking of the files contained on the virtual machines. This task is accomplished (decided), inter alia, with the help of a distributed antivirus system, made up of a security virtual machine. A security virtual machine (SVM) makes it possible to optimize the process of using the resources of the host machine (which are limited), since in this case the host machine does not have to provide additional resources to each virtual machine when conducting the antivirus checking of files, but rather it is sufficient to allocate them only to the SVM. In this case, the virtual machines transfer the files (data) requiring an antivirus check to the SVM. At the same time, this approach also has a major drawback. This is due to the fact that, during a massive antivirus check an antivirus check of all or nearly all VMs), the SVM will receive and perform the check simultaneously on many files from many virtual machines (VMs), which may result in lower performance of the SVM, overfilling of the queue of requests for an antivirus check from the VMs, and consequently lower performance of the VMs awaiting the results of the antivirus check. Furthermore, the VMs themselves may stand idle for a long time, awaiting a response for the antivirus file checking, at least because the VMs deployed from an identical standard model may send a large number of identical files (data) to the SVM. Furthermore, the VMs may contain identical instructions as to the time of performing the antivirus check or the location of the files needing an antivirus check. This results in a massive antivirus checking of the identical data residing on the VMs.

There are various approaches at present to optimizing the performance of an antivirus check on virtual machines, one of which is using a common database residing on the SVM. This database will contain the results for previously performed antivirus file checks.

However, one also needs to consider the following circumstance: the effective use of a common database will only occur when the common database is filled with the results of antivirus checks already performed. Therefore, this approach will be rather ineffective when performing the initial massive antivirus checks or when performing a massive checking of a VM involving updates made to the VM. This is due to the fact that, during such a massive antivirus check, the virtual machines will send practically simultaneously the very same files (i.e., identical files) to the SVM, which are not yet present in the common database, and, consequently, the very same file will be checked several times, resulting in both increased overall time for the antivirus checking of files located on the plurality of virtual machines and standstill of the VMs awaiting the results of the antivirus file checking.

For this reason, in order to make efficient use of the advantages of the common database, it is preferably to fill the common database during the antivirus check while taking into consideration the files being sent for the antivirus check from all virtual machines.

SUMMARY

Disclosed are example systems, methods and computer program products for optimization of the time for an antivirus check during simultaneous antivirus checking of software objects from a plurality of virtual machines. In one aspect, an example method includes forming, on a virtual machine, a queue of identifiers of objects for malware analysis; determining a method for selecting objects in the queue for malware analysis; selecting one or more objects from the queue for malware analysis; providing identifiers of the selected objects to a security virtual machine for malware analysis; checking, by the security virtual machine, whether each of the selected objects has been previously provided for malware analysis by another virtual machine; when a selected object has not been previously provided by another virtual machine, performing, by the security virtual machine, a malware analysis of the selected object; and providing, to the virtual machine, a malware analysis result for the selected object.

In another example aspect, forming a queue includes determining a size of the queue.

In another example aspect, determining a method for selecting objects is based on a number of virtual machines that perform malware analysis of objects.

In another example aspect, when a number of virtual machines that perform malware analysis is below a predetermined threshold, the method further includes dividing a list of objects for malware analysis into blocks, wherein a number of blocks corresponds to the number of virtual machines that perform malware analysis, and forming on each virtual machine a queue from the objects in one block.

In another example aspect, when a number of virtual machines that perform malware analysis is above a predetermined threshold, the method further includes selecting objects for malware analysis randomly.

In another example aspect, selecting one or more objects from the queue for malware analysis is based on objects selected for malware analysis on one or more other virtual machines.

In another example aspect, the method further includes broadcasting to other virtual machines information about objects selected for malware analysis on the virtual machine.

In another example aspect, checking, by the security virtual machine, whether each of the selected objects has been previously provided for malware analysis by another virtual machine, includes checking if a malware analysis result of the selected object is contained in an antivirus database.

In another example aspect, when the malware analysis result of the selected object is contained in the antivirus database, the method further includes retrieving the malware analysis result from the antivirus database and providing to the virtual machine the malware analysis result of the selected object.

In another example aspect, performing malware analysis of the selected object further includes, storing a malware analysis result of the selected object in an antivirus database.

In another aspect, an example system for malware detection on virtual machines includes a data storage configured to store a plurality of objects; and a hardware processor coupled to the data storage and configured to execute a plurality of virtual machines and a security virtual machine, wherein: a virtual machine is configured to: form a queue of identifiers of objects for malware analysis; determine a method for selecting objects in the queue for malware analysis; select one or mare objects from the queue for malware analysis; and provide identifiers of the selected objects to a security virtual machine for malware analysis; and a security virtual machine is configured to: check whether each of the selected objects has been previously provided for malware analysis by another virtual machine; when a selected object has not been previously provided by another virtual machine, perform a malware analysis of the selected object; and provide, to the virtual machine, a malware analysis result for the selected object.

In another aspect, an example non-transitory computer readable medium stores computer executable instructions for malware detection on virtual machines, including instructions for: forming, on a virtual machine, a queue of identifiers of objects for malware analysis; determining a method for selecting objects in the queue for malware analysis; selecting one or more objects from the queue for malware analysis; providing identifiers of the selected objects to a security virtual machine for malware analysis; checking, by the security virtual machine, whether each of the selected objects has been previously provided for malware analysis by another virtual machine; when a selected object has not been previously provided by another virtual machine, performing, by the security virtual machine, a malware analysis of the selected object; and providing, to the virtual machine, a malware analysis result for the selected object.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for antivirus checking of objects in a virtual environment. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
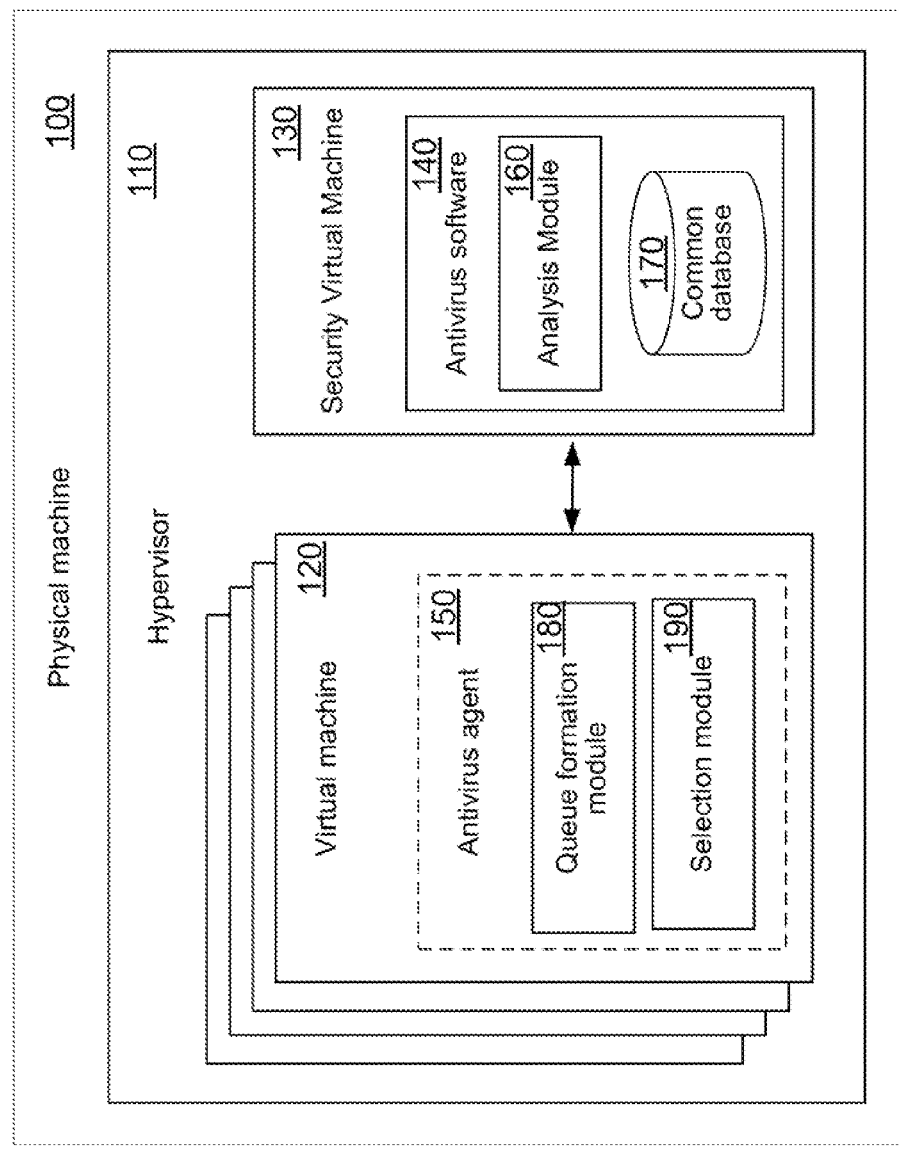
FIG. 1 illustrates a schematic diagram of an example virtual environment in which antivirus checking of objects may be performed.

FIG. 1 illustrates a schematic diagram of an example virtual environment in which antivirus checking of objects may be performed. The virtual environment includes a plurality of virtual machines and systems for their communication and control. The number of virtual machines may be several virtual machines (from 1 to 10) or it may be hundreds or even thousands. The presence of a large, even an enormous number of virtual machines (VMs) also requires a corresponding volume of computing resources. Therefore, the virtual machines can be deployed either on a single host machine (for example, the physical machine 100), or on a cluster of host machines. Each host machine contains at least a hypervisor, which is designed to monitor the VMs deployed on the same host machine. The task of monitoring involves controlling and distributing the computing resources of the host machine among the VMs. It should be noted that the hypervisor is essentially a "shell" between the host machine and all the VMs deployed on the same host machine. Thus, the physical machine 100 contains the hypervisor 110, which controls the computing resources of the physical machine 100 and monitors the performance of all the VMs 120.

Each VM 120 may be running an operating system (OS), which may be needed both for the work of the users and for the file servers or web servers. It may be noted that the operating system can be the same or different (such as Microsoft Windows, Linux, Mac OS) on the VMs 120. Furthermore, any given VM 120 can have the form of a personal computer, or that of a mobile device, such as a notebook or a smartphone.

In one example aspect, the protection for the virtual machines against various malicious programs and applications is provided by an antivirus system, which is shown in FIG. 1 in the form of several components distributed among the VMs 120. Thus, one component of the antivirus system is an antivirus software 140, which is designed to perform the antivirus checking tasks and which has been placed on a special VM, namely, the security virtual machine (SVM) 130. It should be noted that the SVM 130 is essentially the very same VM 120, only configured (as mentioned above) to perform antivirus checking tasks. Another component is any given data transmission means (not shown in the figure), which is situated on each VM 120 and designed to transmit data (files) on the SVM 130 to the antivirus software 140 for performance of the antivirus check. Thus, in one embodiment the work of the data transmission means can be done by an antivirus agent 150. An antivirus agent 150 in modern antivirus systems can perform a rather large number of tasks, from interaction with the antivirus software (such as data transmission) to real-time monitoring of events occurring on the VM 120 and making a detailed analysis of them (for example, by using an expert system, which is based on analysis of the actions taking place). The functionality of each component depends on the settings of the antivirus system, which is generally done when introducing this system into the virtual environment and when installing the antivirus agent 150 on each VM 120. A number of criteria are considered during the setup, so that the functionality of the components can be the same, as well as different from each other.

In one example aspect, the antivirus software 140 contains at least an analysis module 160 and an antivirus database (not shown in the figure). The analysis module 160 performs the antivirus checking tasks with the aid of various methods of antivirus checking, such as the method of signature analysis, heuristic methods, expert systems or other known antivirus checking methods. The antivirus database contains various information needed to perform the antivirus check, such as a list of signatures of malicious programs, a list of trusted files (whitelist), a list of untrusted files (blacklist), lists of various checking rules (such as a list of rules describing the sequence of actions taking place in the operating system and classified as malicious behavior), and the results of previous antivirus checks. Consequently, the antivirus software 140 receives requests from the data transmission means situated on all the VMs 120 to perform an antivirus check of certain files. During the performance of the antivirus check, in order to optimize the resources and speed up the time of the antivirus check itself for the analysis module 160, it may be desirable to use the results of previous antivirus checks on all the VMs 120, which results are stored in the antivirus database. The analysis module 160 will perform a preliminary antivirus check and make a decision as to the need for a further antivirus analysis or send the verdict that the object is malicious to the VM 120.

In one example aspect, the results of the preliminary antivirus checks may be stored in a separate database, such as the common database 170. The common database 170 provides stored information to the analysis module 160 for performing the preliminary analysis of objects in order to determine the need to perform further antivirus checking. It should be noted that this database 170 can be a temporary database or it will contain information (results) only on current objects for the corresponding virtual environment containing the VM 120. Currency of results is governed in various ways, for example, on the basis of the time of storage of the results in the database or the number of times a given result is retrieved. The results can be stored in the common database 170, at least, in the form of a hash sum of an object, metadata of an object, or a symbolic designation indicating a particular decision based on the results of the antivirus checking of the object. The term "object", as used herein, refers to a computer file, an archive, a script, an applet, an email, a URL address, a SMS and MMC message or other type of data.

In one example aspect, the results stored in the common database 170 can only be utilized if an antivirus check of the corresponding object has been performed previously. Therefore, it is necessary to perform the filling of such a database immediately during the antivirus check, taking into account the files being sent for the antivirus check from each VM 120.

Thus, the system for filling the common database during the performance of an antivirus check of the objects on the virtual machines (hereafter, the filling system) makes it possible to keep such a common database 170 current (the currency of the database 170 is dictated by the currency of the results contained in it) and provide an efficient antivirus check (for example, on-demand scanning, on-access scanning) during the initial booting of the VM 120 or a general updating of all the VMs 120 (such as updating of the operating system or applications), followed by a general antivirus check. The filling system includes an analysis module 160 and a common database 170, which reside on the SVM 130, and also a queue formation module 180 and a selection module 190, which reside on each VM 120. The purpose of the analysis module 160 and the common database 170 has been presented above. The queue formation module 180 is configured to form a list of files needing an antivirus check, to determine the length of the queue of files for presentation of the files to the antivirus check, and to form said queue of files. The selection module 190 is configured to determine the method of selecting files and to subsequently select a file from the queue of files according to the method of selecting files (objects). It should be noted that during the selection of a file for the antivirus check the selection module 190 takes into account the selection of files on the other virtual machines. Thus, it guarantees that the files which are presented for the antivirus check to the analysis module 160 are not duplicated. The functions of the queue formation module 180 and the selection module 190, as well as the interactions of all the module of the structure of the filling system, will be discussed more closely when describing FIG. 2.

Figure 2:
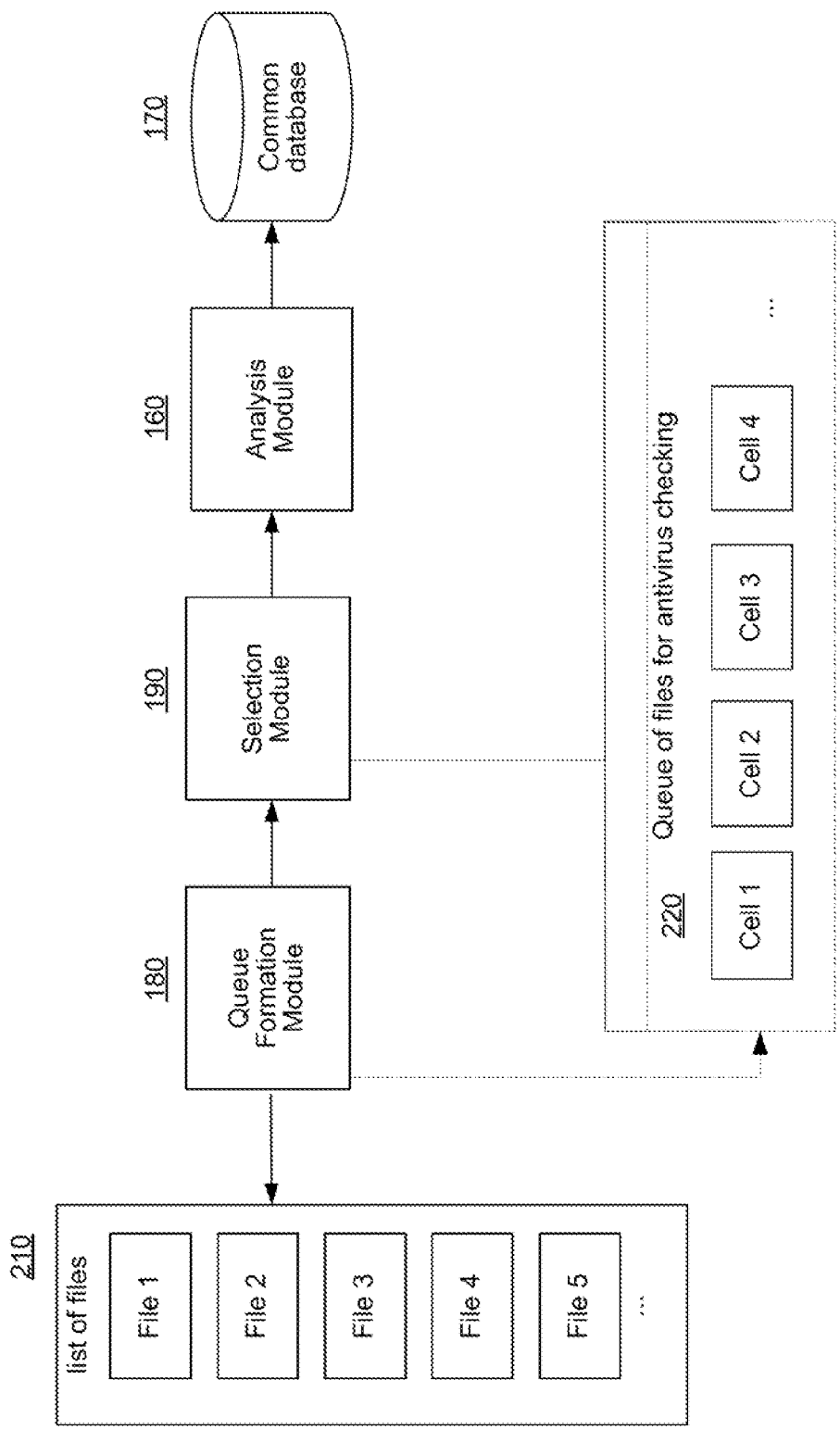
FIG. 2 illustrates a schematic diagram of an example interaction of the components of a system for antivirus checking of objects in a virtual environment.

FIG. 2 shows schematic diagram of an example interaction of the components of a system for antivirus checking of objects in a virtual environment, and particularly the interaction of the components of the system for filling the common database during the performance of the antivirus file check on the virtual machines. It should be noted that the filling system will be discussed in regard to only one VM 120, although the components of the given filling system also interact with the components on all the other VMs 120 located in the same virtual environment.

For example, VM 120 has to perform an antivirus check of a directory of files that contains a certain number of files (the number of files may vary from one to several tens of thousands of files, but again is not limited to this number). Data from the directory of files is presented to the queue formation module 180, which forms a list of files 210 by sorting through all the files from the directory of files. In this case, the list of files 210 will contain at least the full name of the files (in other words, the path to the location of each file on the hard disk). The list of files 210 may also contain a numbering of the files in terms of the list and the hash sum of each file. Moreover, the queue formation module 180 will create the queue of files 220 from which the selection of files will then be done for their presentation to the antivirus check. The queue of files 220 can be in the form of a set of cells, the number of cells (the length of the queue) being limited. One example for determining the length of the queue of files 220 is an approach based on determining the average number of files out of the total number of files situated on all the VMs 120 and requiring an antivirus check. For this, the queue formation module 180 can interact with the queue formation modules located on other VMs 120. One example for the interaction of the VM 120 is a broadcast notification of each VM 120. Yet another example of the choosing of the length of the queue of files 220 is an approach based on a division of the total number of files requiring an antivirus check on the corresponding VM 120 by at least two. The value of the divisor is chosen on the basis of practical experience with the use of this approach in the proposed invention. After determining the length of the queue of files 220, the queue formation module 180 places a file in each cell of the queue of files 220 in accordance with the list of files 210. In this way, the queue of files 220 is formed for the antivirus check.

It should be noted that the filling of all the cells in the queue of files 220 by the queue formation module 180 and the later selecting of the file from the queue by the selection module 190 for sending on to the antivirus check are done on the basis of various file selection methods. In this case, at least the method of random selection and the block method are the file selection methods.

Thus, in one example aspect, the method of selection of files will be determined on the basis of the number of VMs 120 performing the antivirus check at the given time. If the antivirus check will be performed on a small number of such as fewer than one hundred VMs 120, then the block method will be used. The block method involves the formation of the queue of files 220 on each VM 120 from different parts of the list of files 210. The arbitrary dividing of the list of files 210 into parts is based here on determining the precise number of VMs 120 taking part in the antivirus check and dividing the list of files 210 into the given number of VMs 120. After this, the queue of files on each VM 120 is filled from the corresponding block. Note that if the corresponding block runs out of files, then files may be selected from the next block. If the corresponding block was the last block, that next block will be the first block from the list of the files 210. After the filling of the queue of files 220, the selection module 190 performs a consecutive selection of the files which are then provided to the analysis module 160.

Let us consider for example the block method. Let us assume that an antivirus check is being done on fifteen VMs 120. Consequently, on each VM 120, the list of files 210 will be provisionally divided into fifteen parts. Then, on one VM 120, the queue of files 220 will start to be formed from the first part of the list of files 210, on another (second) VM 120 the queue of files 220 will start to be formed from the second part of the list of files 210, and so on.

In one example aspect, the block method can have yet another division. Thus, if there are fewer than 10 VMs 120 performing the antivirus check, a comparison will be done between the lists of files 210 of at least two VMs 120. For example, the comparison can be done either based on the hash sums of the files or based on the hash sums of parts of the list of files 210. Next, all the identical files on the different VMs 120 will be sent from only one VM 120 or they will be equally divided among the VMs 120 for subsequent sending to the antivirus check. In this case, if there are more than 10 but less than 100 VMs, the file selection will be done by the above-described block method.

In the case when the antivirus check is done on a large number (dozens or hundreds) of VMs 120, the method of random selection will be used. This method involves filling the queue of files 220 sequentially according to the list of files 210, while the subsequent selection of a file for presentation to the antivirus check is done at random. In this case, a location becoming free can be filled either by the list of files 210 or at random. Afterwards, each VM 120 will contain a different queue of files 220 from which the selection of files will be done at random. Thus, there is no redundancy in the files that are presented for the antivirus check from each VM 120. Basically, when selecting a file on one VM 120 the selection of files on the other VMs 120 will also be taken into account.

It should be noted that the above-described approaches (methods) for realizing the present system can be used either jointly or individually.

After obtaining the file from the selection module 190, the analysis module 160 will perform its antivirus check. The principle of performing the antivirus check by the analysis module 160 has been described in FIG. 2. After performing the antivirus check, the result is added to the common database 170. It should be noted that the common database 170 containing solutions for previously checked files can also be used during the performance of the antivirus check.

In one example aspect, after obtaining the file for antivirus check, the analysis module 160 may inform all VMs 120, for example, via a broadcast alert or by inserting the relevant information (e.g. bit flag) into the common database 170. This information can be used to fill the queue of files on each VM 120. For example, the file won't be added to the queue of files 220 or excluded from queue of files 220 through adding this file to the end of the list 210.

Figure 3:
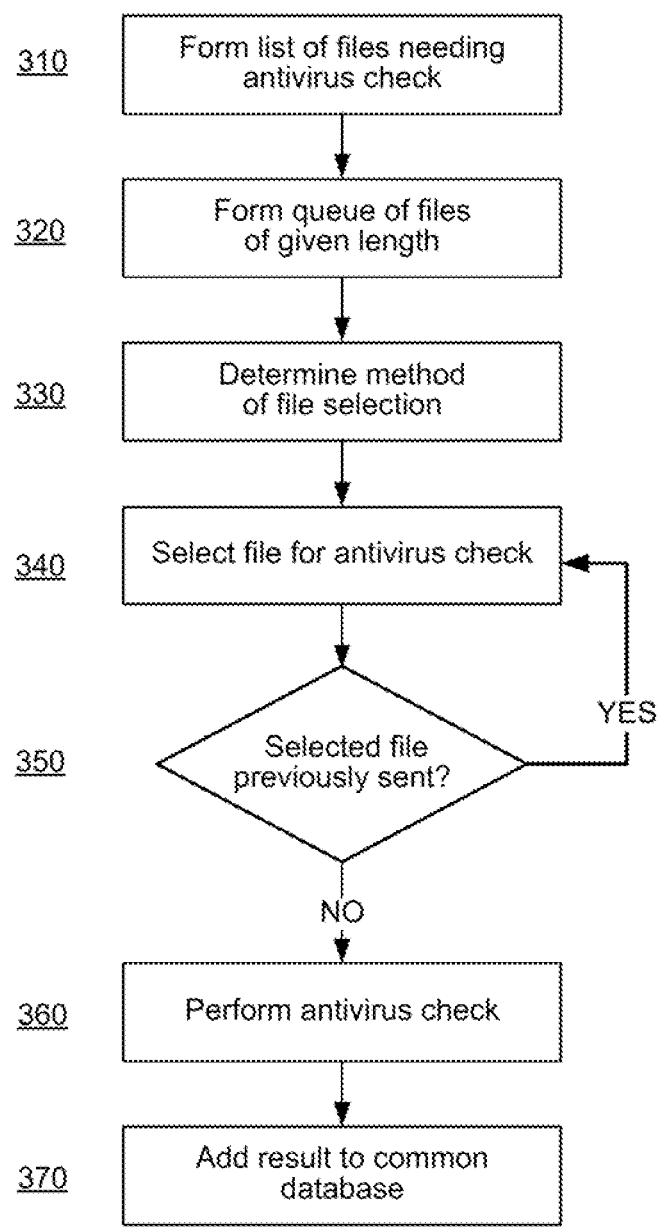
FIG. 3 illustrates a flow diagram of example method for antivirus checking of objects in a virtual environment.

FIG. 3 shows an example method for antivirus checking of objects in a virtual environment, and particularly the method of working of the system for filling the common database during the performing of an antivirus check for the objects on virtual machines. In step 310, the list of files 210 is formed, on the files of which the antivirus check needs to be performed. It should be noted that instead of a file one can also use any other computer object, such as a script, an applet, an email and URL address, as well as links to the objects themselves. The list of files 210 is formed with the aid of the queue formation module 180, which uses the corresponding directory of files. The list of files 210 here will contain at least the full name of the files (in other words, the path to the location of each file on the hard disk). The list of files 210 may also contain a numbering of the files and the hash sum of each file. In step 320 the queue formation module 180 forms a queue of files of a given length. Examples of approaches to determining the length of the queue of files were presented in FIG. 2. After determining the length of the queue of files 220 the queue formation module 180 forms the given queue of files 220 with the help of files from the list of files 210.

In step 330, the method is determined for selecting files for presentation thereof to the antivirus check. In one example aspect, the method of file selection will be determined on the basis of the number of VMs 120 performing an antivirus check at the given time. This example has been described in FIG. 2. Next, in step 340, the selection module 190 selects files for sending to the analysis module 160 in accordance with the determined file selection method, which is able to allow for the sending of files to the antivirus check from other VMs 120. In step 350, the analysis module 160 determines whether the file received from the corresponding VM 120 has been previously sent from another VM 120. In one example aspect, the determination of the sending of the given file is done by determining the presence of a solution for the given file in the common database storing solutions for previously checked files. In this case, if information about the corresponding file is found in the common database, the antivirus check will not be done on the file, and the solution for the given file will be sent to the inquiring VM 120. Otherwise, if there is no information in the common database, then in step 360 the analysis module 160 will perform the antivirus check of the file. The result of the antivirus check in step 370 is added by the analysis module 160 to the common database 170. After this, this result of the antivirus analysis of the given file may be also sent to the VM 120 that sent the file for the antivirus check.

Figure 4:
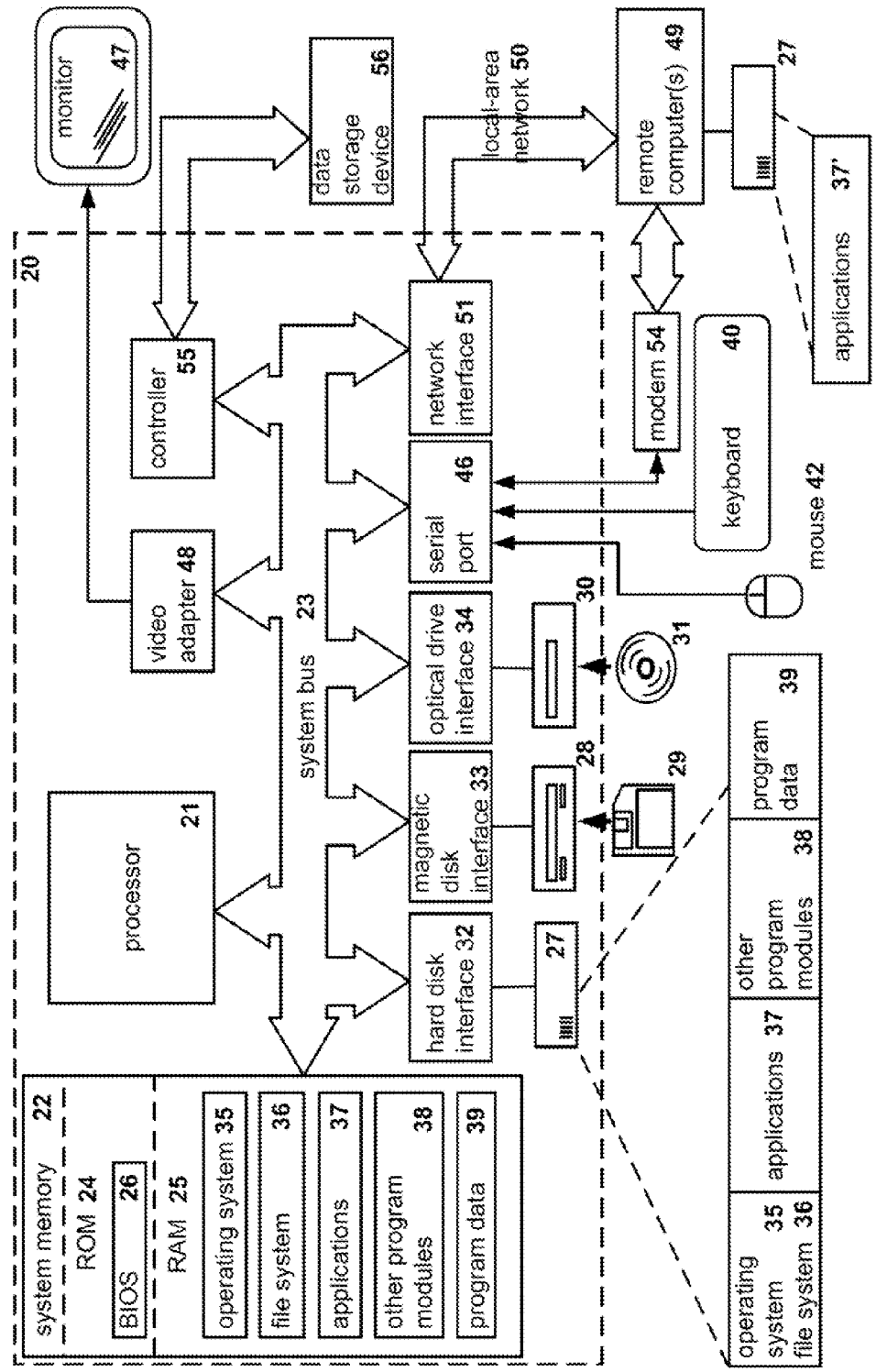
FIG. 4 illustrates an example of a general-purpose computer system on which the disclosed systems and method of antivirus checking of objects in a virtual environment can be implemented.

FIG. 4 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 4 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for malware detection on virtual machines, the method comprising:
    forming, on at least one virtual machine configured to perform an antivirus check, a queue of identifiers of objects for malware analysis;
    selecting objects in the queue for malware analysis, wherein selecting comprises: dividing the objects in the queue for malware analysis into a number of blocks corresponding to a number of virtual machines when a number of virtual machines configured to perform the antivirus check is above a predetermined threshold, and randomly selecting the objects in the queue for malware analysis when the number of virtual machines configured to perform the antivirus check is below the predetermined threshold;
    providing identifiers of the selected objects to a security virtual machine for malware analysis;
    checking, by the security virtual machine, whether each of the selected objects has been previously provided for malware analysis by another virtual machine;
    when a selected object has not been previously provided by another virtual machine, performing, by the security virtual machine, a malware analysis of the selected object; and
    providing, from the security virtual machine to the at least one virtual machine, a malware analysis result for the selected object.

2. The method of claim 1, wherein forming a queue includes determining a size of the queue.

3. The method of claim 1, wherein dividing the objects in the queue for malware analysis into blocks further includes forming on each virtual machine a queue from the objects in one block.

4. The method of claim 1, wherein selecting one or more objects from the queue for malware analysis is based on objects selected for malware analysis on one or more other virtual machines.

5. The method of claim 4, further comprising broadcasting to other virtual machines information about objects selected for malware analysis on the virtual machine.

6. The method of claim 1, wherein checking, by the security virtual machine, whether each of the selected objects has been previously provided for malware analysis by another virtual machine, includes checking if a malware analysis result of the selected object is contained in an antivirus database.

7. The method of claim 6, wherein, when the malware analysis result of the selected object is contained in the antivirus database, retrieving the malware analysis result from the antivirus database and providing to the at least one virtual machine the malware analysis result of the selected object.

8. The method of claim 1, wherein performing malware analysis of the selected object further includes, storing a malware analysis result of the selected object in an antivirus database.

9. A system for malware detection on virtual machines, the system comprising:
    a data storage configured to store a plurality of objects; and
    a hardware processor coupled to the data storage and configured to execute a plurality of virtual machines and a security virtual machine, wherein:
    at least one virtual machine configured to perform an antivirus check and further configured to:
        form a queue of identifiers of objects for malware analysis;
        select objects in the queue for malware analysis, wherein selecting comprises: dividing the objects in the queue for malware analysis into a number of blocks corresponding to a number of virtual machines when a number of virtual machines configured to perform the antivirus check is above a predetermined threshold, and randomly selecting the objects in the queue for malware analysis when the number of virtual machines configured to perform the antivirus check is below the predetermined threshold; and
        provide identifiers of the selected objects to a security virtual machine for malware analysis; and
    the security virtual machine is configured to:
        check whether each of the selected objects has been previously provided for malware analysis by another virtual machine;
        when a selected object has not been previously provided by another virtual machine, perform a malware analysis of the selected object; and
        provide, to the at least one virtual machine, a malware analysis result for the selected object.

10. The system of claim 9, wherein forming a queue includes determining a size of the queue.

11. The system of claim 9, wherein dividing the objects in the queue for malware analysis into blocks further includes forming on each virtual machine a queue from the objects in one block.

12. The system of claim 9, wherein the at least one virtual machine is configured to select the objects from the queue for malware analysis based on objects selected for malware analysis on one or more other virtual machines.

13. The system of claim 12, wherein the at least one virtual machines is further configured to broadcast to other virtual machines information about objects selected for malware analysis on the virtual machine.

14. The system of claim 9, wherein the security virtual machine is configured to check whether each of the selected objects has been previously provided for malware analysis by another virtual machine by checking if a malware analysis result of the selected object is contained in an antivirus database.

15. The system of claim 14, wherein, when the malware analysis result of the selected object is contained in the antivirus database, the security virtual machine is further configured to retrieve the malware analysis result from the antivirus database and provide the malware analysis result of the selected object to the at least one virtual machine.

16. The system of claim 9, wherein the security virtual machine performing malware analysis of the selected object further includes storing a malware analysis result of the selected object in an antivirus database.

17. A non-transitory computer readable medium comprising computer executable instructions for malware detection on virtual machines, including instructions for:
    forming, on at least one virtual machine configured to perform an antivirus check, a queue of identifiers of objects for malware analysis;
    selecting objects in the queue for malware analysis, wherein selecting comprises: dividing the objects in the queue for malware analysis into a number of blocks corresponding to a number of virtual machines when a number of virtual machines configured to perform the antivirus check is above a predetermined threshold, and randomly selecting the objects in the queue for malware analysis when the number of virtual machines configured to perform the antivirus check is below the predetermined threshold;

providing identifiers of the selected objects to a security virtual machine for malware analysis;

checking, by the security virtual machine, whether each of the selected objects has been previously provided for malware analysis by another virtual machine;

when a selected object has not been previously provided by another virtual machine, performing, by the security virtual machine, a malware analysis of the selected object; and providing, from the security virtual machine to the at least one virtual machine, a malware analysis result for the selected object.

\* \* \* \* \*